US008260794B2

(12) United States Patent
Caceres

(10) Patent No.: US 8,260,794 B2
(45) Date of Patent: Sep. 4, 2012

(54) CREATING PLAYBACK DEFINITIONS INDICATING SEGMENTS OF MEDIA CONTENT FROM MULTIPLE CONTENT FILES TO RENDER

(75) Inventor: Barry Mark Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 11/848,236

(22) Filed: Aug. 30, 2007

(65) Prior Publication Data

US 2009/0063484 A1  Mar. 5, 2009

(51) Int. Cl.
G06F 7/00 (2006.01)
G06F 17/30 (2006.01)
(52) U.S. Cl. ........................................ 707/758; 707/805
(58) Field of Classification Search ................. 707/3, 7, 707/104.1; 386/46, 68
See application file for complete search history.

(56) References Cited

U.S. PATENT DOCUMENTS

| 5,765,164 | A * | 6/1998 | Prasad et al. ........................... 1/1 |
| 6,389,467 | B1 * | 5/2002 | Eyal ............................... 709/223 |
| 6,519,648 | B1 * | 2/2003 | Eyal ............................... 709/231 |
| 6,631,107 | B1 | 10/2003 | Ito et al. |
| 6,635,816 | B2 * | 10/2003 | Funaki ........................... 84/477 R |
| 6,822,153 | B2 * | 11/2004 | Comair et al. ................... 84/609 |
| 6,889,383 | B1 | 5/2005 | Jarman |
| 6,898,799 | B1 | 5/2005 | Jarman |
| 6,963,877 | B2 * | 11/2005 | Layeghi ...................... 369/30.06 |
| 6,963,952 | B1 | 11/2005 | La |
| 7,509,178 | B2 * | 3/2009 | Logan et al. ..................... 700/94 |
| 2003/0026598 | A1 | 2/2003 | Karitani |
| 2004/0167890 | A1 * | 8/2004 | Eyal .................................. 707/3 |
| 2005/0154987 | A1 * | 7/2005 | Otsuka et al. ................. 715/716 |
| 2006/0236220 | A1 | 10/2006 | Jarman |
| 2007/0002696 | A1 | 1/2007 | Wrobel |
| 2007/0033170 | A1 * | 2/2007 | Sull et al. .......................... 707/3 |
| 2007/0038612 | A1 * | 2/2007 | Sull et al. .......................... 707/3 |
| 2007/0044010 | A1 * | 2/2007 | Sull et al. ................... 715/500.1 |
| 2007/0106685 | A1 * | 5/2007 | Houh et al. ................... 707/102 |
| 2007/0118873 | A1 * | 5/2007 | Houh et al. ................... 725/136 |
| 2007/0136488 | A1 * | 6/2007 | Cho et al. ....................... 709/231 |
| 2007/0291404 | A1 * | 12/2007 | Morse et al. ..................... 360/81 |
| 2008/0041220 | A1 * | 2/2008 | Foust et al. ..................... 84/625 |
| 2008/0162573 | A1 * | 7/2008 | Eyal ........................... 707/104.1 |
| 2009/0148133 | A1 * | 6/2009 | Nomura et al. ............... 386/124 |

OTHER PUBLICATIONS

Clearplay, "ClearPlay FAQ", [online], 2007, [retrieved on Jul. 24, 2007], retrieved from the Internet at <URL: http://clearplay.custhelp.com/cgi-bin/clearplay.cfg/php/enduser/std_adp...>, 4 pp.

* cited by examiner

*Primary Examiner* — Usmaan Saeed
(74) *Attorney, Agent, or Firm* — David W. Victor; Konrad Raynes & Victor LLP

(57) ABSTRACT

Provided are a method, system, and article of manufacture for creating playback definitions indicating segments of media content from multiple content files to render. User input is received indicating a plurality of segments of media content from a plurality of media files and an ordering of the segments. The media content comprises at least one of audio and video content. A playback definition is generated in a computer readable medium indicating the plurality of segments in the user input and the ordering of the segments. The playback definition is processed to render the media content of the indicated segments in the indicated ordering.

23 Claims, 4 Drawing Sheets

Playback Definition

Segment

CREATING PLAYBACK DEFINITIONS INDICATING SEGMENTS OF MEDIA CONTENT FROM MULTIPLE CONTENT FILES TO RENDER

BACKGROUND OF THE INVENTION

1. Field of the Invention

The present invention relates to a method, system, and article of manufacture for creating playback definitions indicating segments of media content from multiple content files to render.

2. Description of the Related Art

A user may access multimedia content in digital media files from different disks or media sources. For instance, content from a movie may be distributed over multiple Digital Versatile Discs (DVD), which requires the user to manually or through controls switch DVDs while watching. Further, the user may download different multimedia files and store them in a computer readable storage media. However, to render portions of content from these different media files, the user would have to intervene to select the portions of the different media files to render.

There is a need in the art for improved techniques for users to access multimedia content from media files

SUMMARY

Provided are a method, system, and article of manufacture for creating playback definitions indicating segments of media content from multiple content files to render. User input is received indicating a plurality of segments of media content from a plurality of media files and an ordering of the segments. The media content comprises at least one of audio and video content. A playback definition is generated in a computer readable medium indicating the plurality of segments in the user input and the ordering of the segments. The playback definition is processed to render the media content of the indicated segments in the indicated ordering.

DETAILED DESCRIPTION

Figure 1:
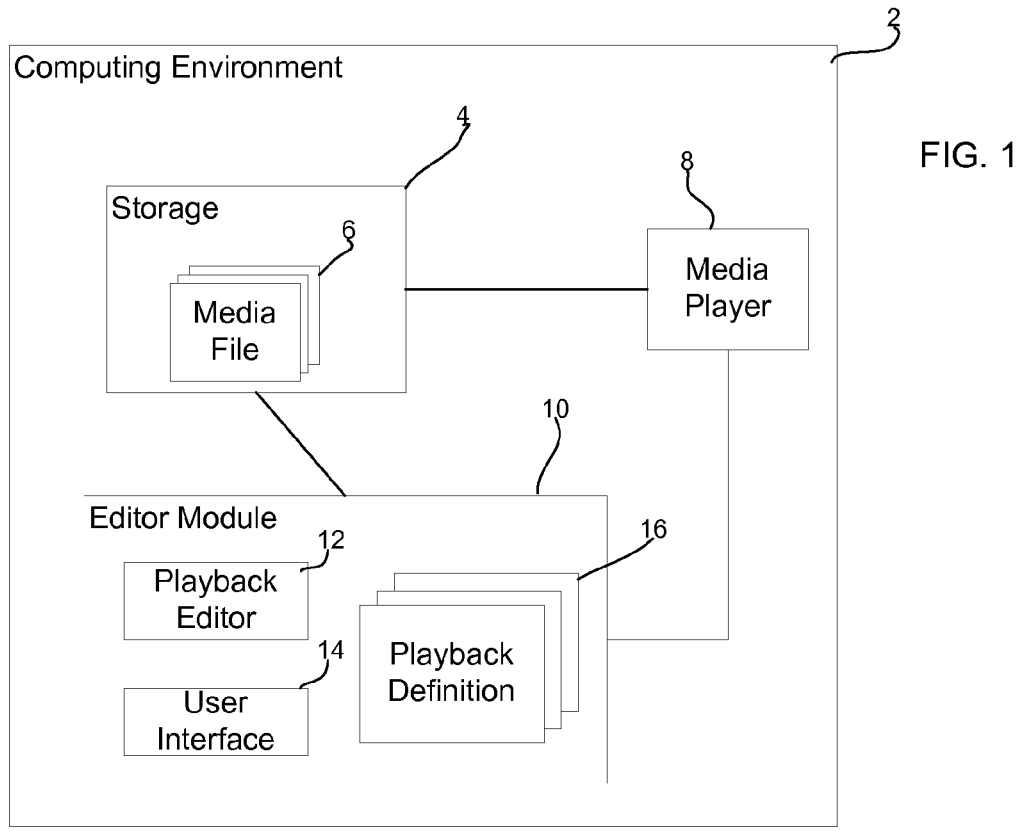
FIGS. 1, 2, and 3 illustrate embodiments of computing environments.

FIG. 1 illustrates an embodiment of a computing environment 2 including a storage 4 having one or more media files 6, a media player 8 to render the media content in the media files 6 on an output device, e.g., computer video monitor, television, etc., and an editor module 10. The editor module 10 includes a playback editor 12 that generates and renders a user interface 14 to allow a user to control the playback editor 12 to create playback definitions 16, where each playback definition indicates segments of media content from the media files 6 to play in a specified order.

The storage 4, media player 8, and editor module 10 may be implemented in one or more electronic devices, and may communicate over a network or a computer bus. The storage 4 may comprise a magnetic, optical or electronic storage media, such as hard disk drives, Flash Memory, optical disks, etc., and may include a storage drive to read the media.

Figure 2:
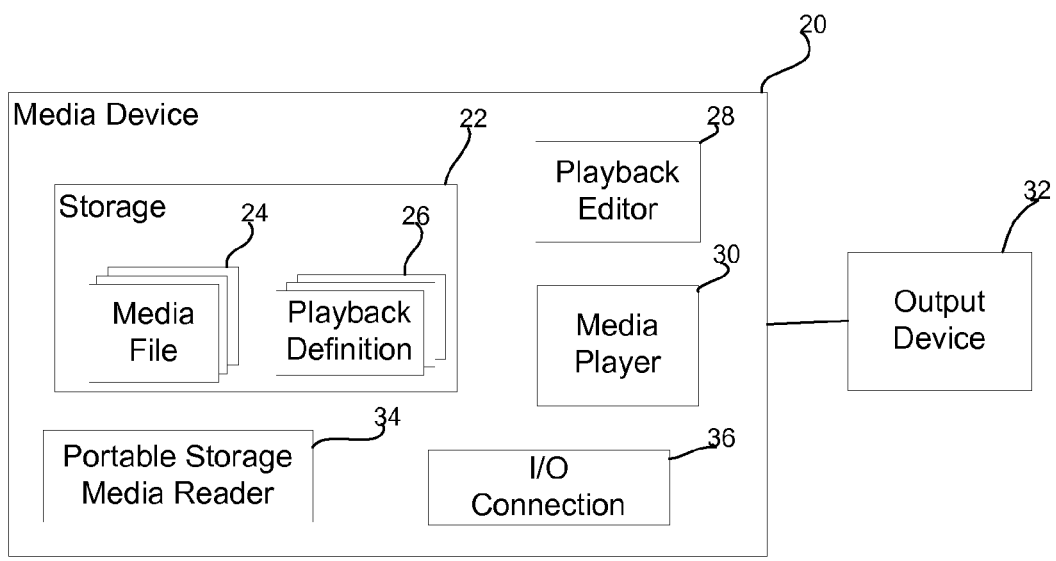

FIG. 2 illustrates an embodiment of a computing environment implemented in a media device 20, such as a multimedia player, Digital Versatile Disc (DVD) player, etc., where the components of FIG. 2 are implemented in hardware and software in the media device unit 20, which includes a storage 22 having multiple media files 24, playback definitions 26 indicating an ordered set of segments of media content in multiple media files 24 to play in a specified order, a playback editor 28 to create playback definitions 26, and a media player 30 to process playback definitions 24 to render the segments defined in the playback definitions 26 on an output device 32, such as a computer monitor, television, digital audio player, etc. In one embodiment, the media device 20 may not include a playback editor 28 and may only render segments in playback definitions 26 created using a different device having the playback editor 12, 28. The media device 20 may further include a portable storage media reader 34, such as an optical disk reader (e.g., DVD reader), Flash Memory reader, etc. The media device 20 may further include an I/O connection 36 to receive media files 24 and playback definitions 26 from external media devices and servers. For instance, the I/O connection 36 may comprise a network connection to enable the media device 20 to access media files 24 and playback definitions 26 over a network, such as a Local Area Network (LAN), Internet, etc., a connector for connecting to an external storage device, such as a Universal Serial Bus (USB) or Firewire connector, and/or a wireless transmitter/receiver.

Figure 3:
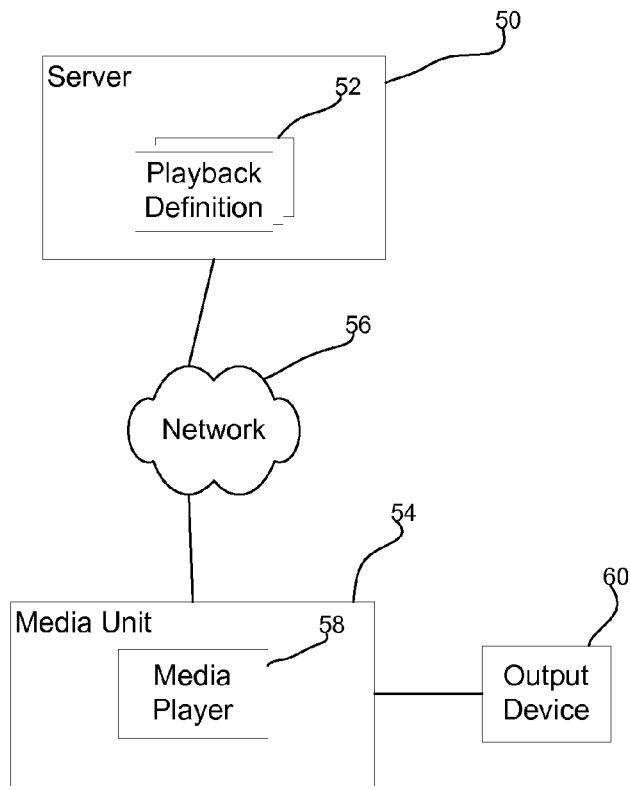

FIG. 3 illustrates an embodiment comprising a network computing environment where a server 50 maintains playback definitions 52 that media units 54 may download over a network 56. The media units 54 include a media player 58 to render media files on an output device 60 according to the information maintained in the downloaded playback definitions 52. The media files having content defined in the playback definitions 52 may be maintained locally at the media unit 54, in storage within the media unit 54 or coupled to the media unit 54, or may be maintained in a remote server 50 accessible over the network 56. The server 50 may charge users for downloading playback definitions 52 or provide the playback definitions 52 at no charge as part of a promotion campaign or free sharing service of playback definitions 52.

The server 50 may include a processor and software to maintain a library of playback definitions for different media files, receive a customer request over a network for one of the playback definitions, and transmit the requested playback definition to the customer initiating the request. The customer media player 58 processes the received playback definition 52 to play the segments of the media files accessible to the customer media player 58 in the ordering indicated in the playback definition 52.

Figure 4:
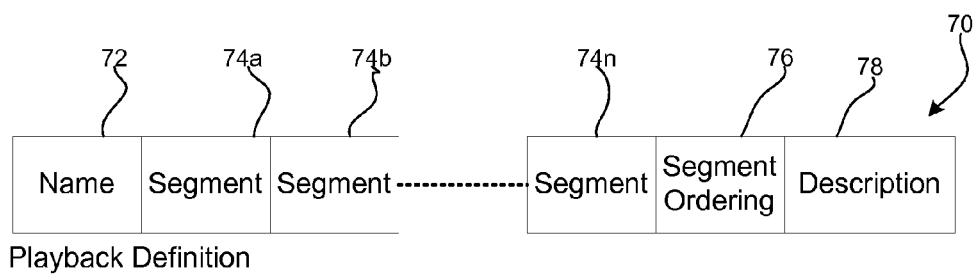
FIG. 4 illustrates an embodiment of a playback definition.

FIG. 4 illustrates an embodiment of a playback definition 70, such as playback definitions 16, 26, 52, as including a playback name 72, multiple segments 74a, 74b . . . 74n, and a segment ordering 76, indicating an ordering in which the segments are played 74a, 74b . . . 74n. The ordering may be indicated by an order in which the segments 74a, 74b . . . 74n are stored in the playback definition 70 or a specified ordering of the segments. A description 78 provides a written description of the media content maintained in the playback definition 70.

Figure 5:
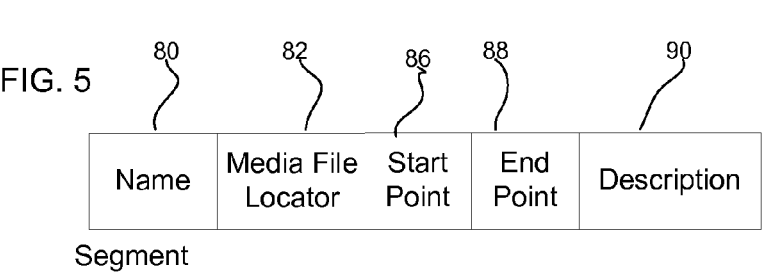
FIG. 5 illustrates an embodiment of a segment defined in a playback definition.

FIG. 5 illustrates an embodiment of a segment 74, such as segments 74a, 74b . . . 74n, including a segment name 80, such as an identifier; a media file locator 82 comprising an identifier of the media file including the media content for the segment, such as resource locator (e.g., Universal Resource Locator (URL)), file path, a disk number in a multi-disc changer, a universal identifier (ID) for the storage media, e.g., DVD, etc.; a start point 86 identifying a starting point in the media file 82 where the segment starts; an end point 88 identifying an ending point in the media file 82 where the segment ends; and a description 90 of the segment, such as a name, persons involved in the content, etc. The start 86 and end 88 points may comprise a user set index, a chapter or section name of content in the content media file 82, a time stamp of the frame or audio content, etc. The start and end points may include points in at or between the beginning and end of the media content in a media file 6, 24.

In one embodiment, the media file 6, 24 may be stored in a removable storage media, such as a DVD, in a multi-disc changer. The multi-disk changer may include multiple disks in storage lots in the changer, and move and load the DVD disks from the storage slots to a media drive, e.g., reader. The multi-disc changer may include an index indicating the disks in the changer that may be loaded to the media drive. In such embodiments, the media file locator 82 for the media file 6, 24 may identify the multi-disc changer device in which the media disk is loaded as well as the name of the media disk and requested file name.

In one embodiment the location of the media files 6, 24 providing media content for the segments may be indicated in the media file locator 82 field. In an alternative embodiment, the media player 8, 30, and 58 may prompt the user for a directory where the files are located or automatically search a default or previously accessed directory.

Figure 6:
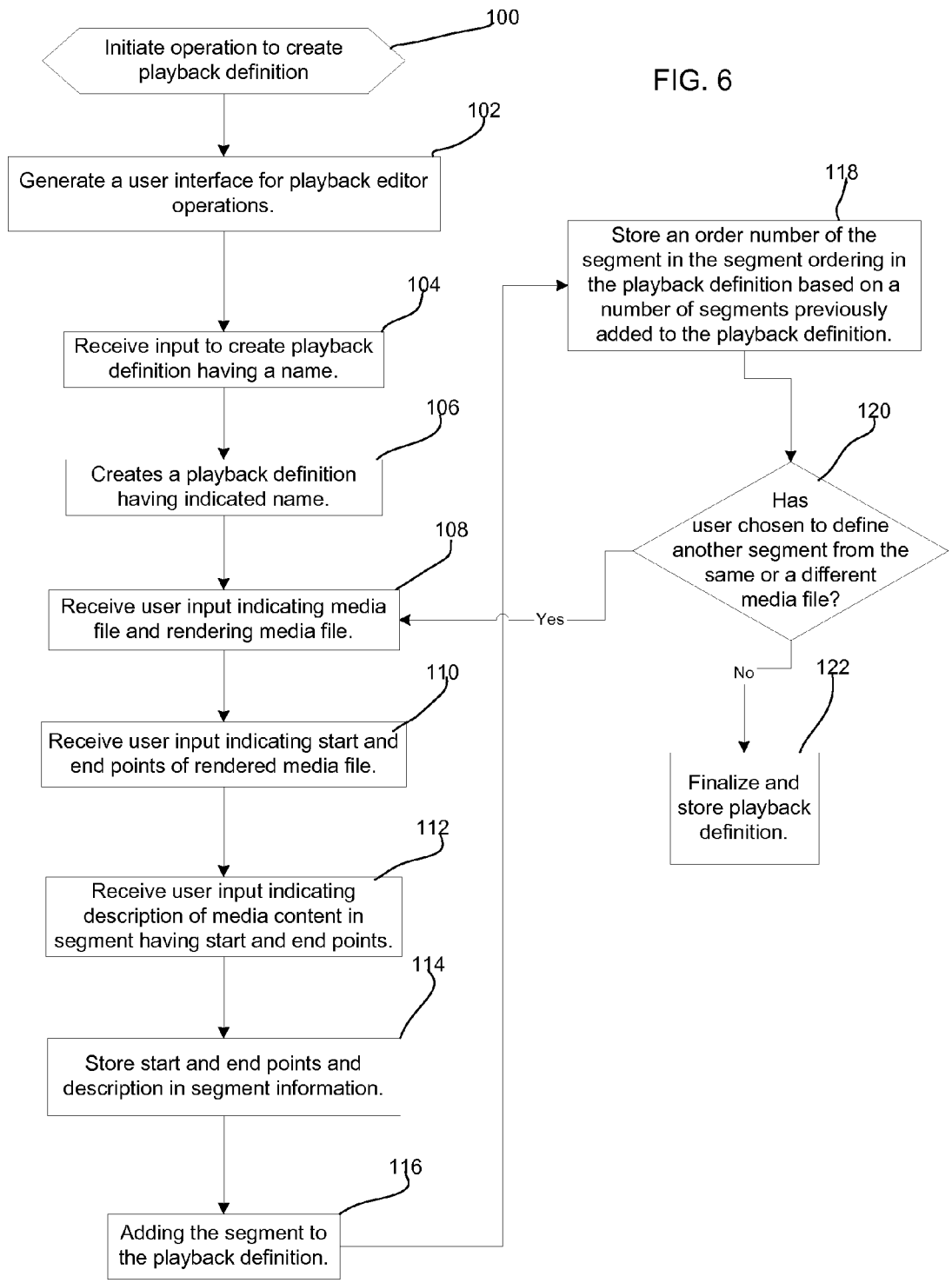
FIG. 6 illustrates an embodiment of operations to create a playback definition.

FIG. 6 illustrates an embodiment of operations performed by the playback editor 12, 28 to create a playback definition 70. Upon initiating (at block 100) an operation to create a playback definition 70, the playback editor 12, 28 generates (at block 102) a user interface 14 to enable a user to control the playback editor 12, 24. Upon receiving (at block 104) user input to create playback definition 16, 26, 52, 70 having a name, the playback editor 12, 28 creates (at block 106) a playback definition 16, 26, 52, 70 having the indicated name in name field 72 (FIG. 4). User input is further received (at block 108), via the user interface 14, indicating a media file 6, 24 and the media file 6, 24 content may be rendered on an output device 32 to allow the user to select the segment while observing the rendered media content. The playback editor 12, 28 receives (at block 110) user input via the user interface 14 indicating start and end points of the media content being rendered. Alternatively, the user may specify start and end points without rendering the media content. The playback editor 12, 28 may further receive (at block 112) user input, via the user interface 14, indicating a description of the media content in the segment having the received start and end points. For instance, if the segment comprises video content, the description may describe the scene, actors involved, etc. The playback editor 12, 28 stores (at block 114) the received start 86 and end 88 points and the description 90 in the segment 74.

The created segment 74 may be added (at block 116) to the playback definition 70, such as one of playback definitions 74a, 74b . . . 74n. The playback editor 12, 28 may store (at block 118) an order number of the segment in the segment ordering 76 (FIG. 4) based on a number of segments previously added to the playback definition. Segments may also be inserted in the middle of the current segments. In such case, all the segments following the inserted segment may need to be reordered. If (at block 120) the user has selected, via the user interface 14, to continue adding segments to the playback definition 16, 26, 52, 70 being created, then control proceeds to block 108 to create another segment for the playback definition 16, 26, 52, 70 in the same or a different media file. If (at block 120) the user has selected not to add further segments, then the playback editor 12, 28 finalizes and stores (at block 122) the playback definition 16, 26, 52, 70.

The playback editor 12, 28 may further be used to edit an existing playback definition 16, 26, 52, 70 to delete segments and insert new segments into the definition.

Figure 7:
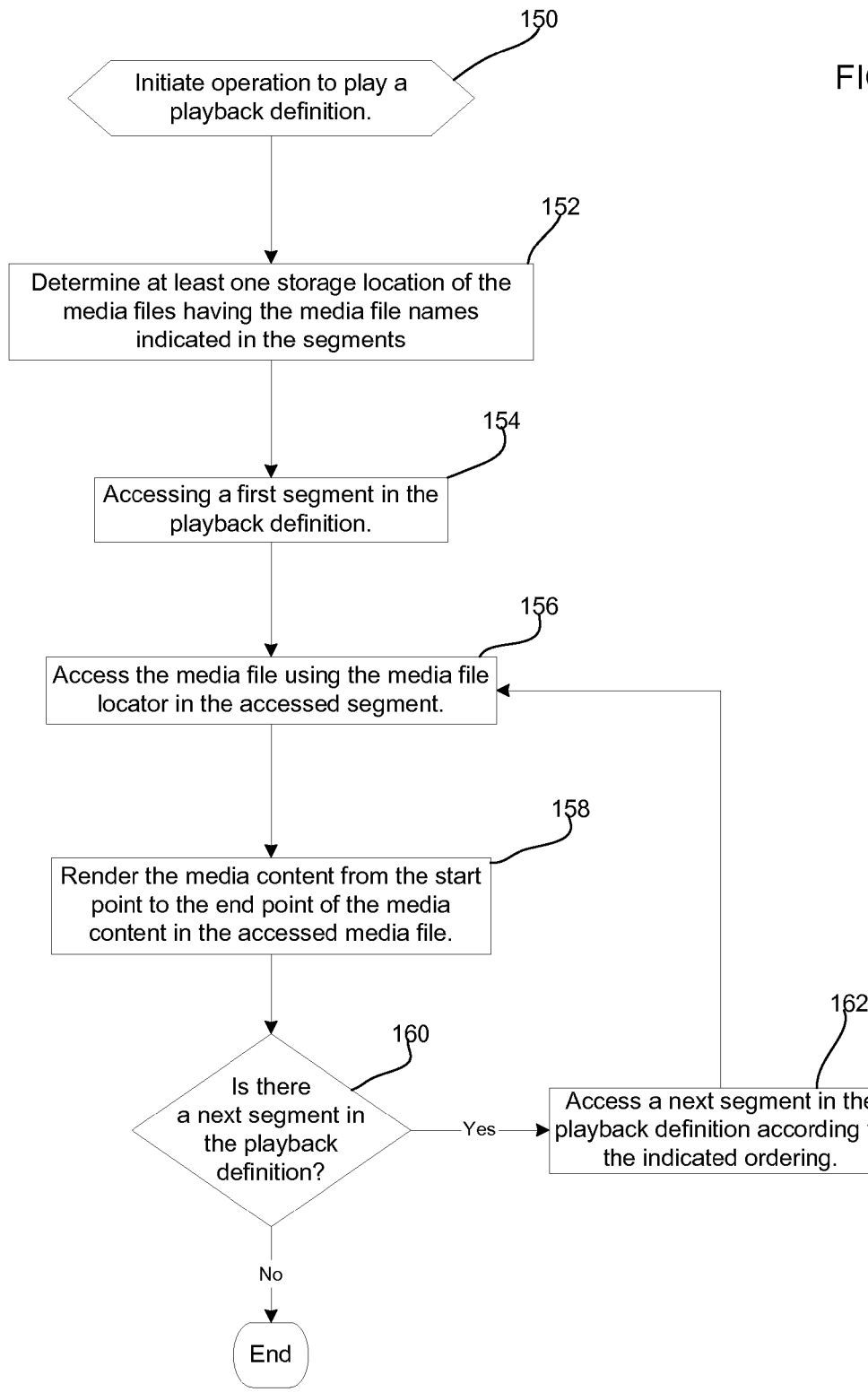
FIG. 7 illustrates an embodiment of operations to render segments of media content from media files indicated in a playback definition.

FIG. 7 illustrates an embodiment of operations performed by a media player 8, 30, and 58 to render the media segments 74, 74b . . . 74n in a playback definition 70 (FIG. 4). Upon initiating (at block 150) an operation to play a playback definition 16, 26, 52, 70, the media player 8, 30, and 58 determines (at block 152) at least one storage location of the media files 6, 24 having the media file locator 82 indicated in the segments 74a, 74b . . . 74n. The location may be determined from field 82 in the segment information 74 or determined by prompting the user to input of a location of the media files 6. The media player 8, 30, 58 accesses (at block 154) a first segment 74a (FIG. 4) in the playback definition 16, 26, 52, 70. The media player 8, 30, 58 accesses (at block 156) the media file 6, 24 using the media file locator 82 information in the accessed segment 74a, 74b . . . 74n. The media content from the start point 86 to the end point 88 of the media content in the accessed media file 6, 24 is rendered (at block 158). If (at block 160) there is a next segment 74b . . . 74n in the playback definition 70, then the media player 8, 30 accesses (at block 162) a next segment 74b . . . 74n in the playback definition 16, 26, 52, 70 according to the indicated segment ordering 76 and proceeds back to block 156 to render the content from that next segment 74b . . . 74n. If (at block 160) there are no further segments to render, then control ends.

Described embodiments provide techniques to allow a user to create a playback definition indicating segments of media content from multiple files to automatically render together in an indicated ordering. Further embodiments provide a media player capable of automatically playing the segments of media content defined in a playback definition. For instance, the media files may comprise video images of DVD disks, such as ISO images. Further, the playback definition may define segments of media contents in different ISO images to play together Additional Embodiment Details The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a non-transitory computer readable storage medium including code executed to perform operations, the operations comprising:

generating a user interface to create a playback definition, wherein the user interface is manipulated by a user to perform:

receiving user input to create the playback definition;

creating the playback definition in response to the received user input;

receiving user input indicating a plurality of segments of media content from a plurality of media files and an ordering of the segments, wherein the media content comprises at least one of audio and video content, wherein the segments each indicate a start point and end point in the media content in one of the files and a media file locator indicating a location of the media in a computer readable storage medium, and wherein at least one of the indicated segments has start and end points between the beginning and end of the media content that comprises less than all of the media content in the media file having the segment;

adding to the playback definition the plurality of segments defined through the user input and the ordering of the segments;

processing the playback definition in response to initiating an operation to play the playback definition by performing for each segment and location indicated in the playback definition according to the ordering:

accessing the media content between the start and end points indicated in the segment from the location indicated in the media file locator for the segment;

rendering the accessed media content between the start and end points indicated in the segment; and accessing a next segment from the playback definition in response to determining that there is a next segment and in response to rendering the accessed media content, wherein the operations of accessing the media content and rendering the accessed media content are performed for the accessed next segment.

2. The article of manufacture of claim 1, wherein the operations further comprise:
generating a user interface in which the media content from the media files is rendered, wherein the user input indicating each of the segments is received with respect to the segment being rendered in the user interface.

3. The article of manufacture of claim 1, wherein the received user input further includes a user entered description for at least one of the segments describing the media content within the segment.

4. The article of manufacture of claim 1, wherein the media files are stored in at least one storage medium, and wherein the user input for each segment indicates the media file locator of the media file in which the segment is included, wherein the segments are accessed in the indicated ordering from the media files at the media file locators in the at least one storage medium to continuously render the segments.

5. The article of manufacture of claim 4, further comprising:
determining at least one storage location of the media files using the media file locators indicated in the segments, wherein the segments are accessed from the determined at least one storage location.

6. The article of manufacture of claim 1, wherein the segments in the playback definition are automatically played uninterrupted in the indicated ordering.

7. The article of manufacture of claim 1, wherein the operations further comprise:
maintaining a library of playback definitions for different media files;
receiving a customer request over a network for one of the playback definitions; and
transmitting the requested playback definition to the customer initiating the request, wherein a customer media player processes the received playback definition to play the segments of the media files accessible to the customer media player in the ordering indicated in the playback definition.

8. The article of manufacture of claim 1, wherein the media files comprise disk images having video content.

9. The article of manufacture of claim 1, wherein a playback editor implemented in a first device performs the operations of generating the user interface to create the playback definition, wherein a second device performs the operations of processing the playback definition to render the media content, and wherein the second device does not perform the playback editor functions of receiving the user input and generating the playback definitions and can only render segments in the playback definition.

10. The article of manufacture of claim 1, wherein the start and end points comprise one of a user set index, a section name of the media content, and a time stamp of a frame having the media content.

11. A system, comprising:
a processor;
a non-transitory computer readable storage medium including instructions executed by the processor including:
a playback editor for generating a user interface to create a playback definition, wherein the user interface is manipulated by a user to perform:
receiving user input to create the playback definition;
creating the playback definition in response to the received user input;
receiving user input indicating a plurality of segments of media content from a plurality of media files and an ordering of the segments, wherein the media content comprises at least one of audio and video content, wherein the segments each indicate a start point and end point in the media content in one of the files and a media file locator indicating a location of the media in a computer readable storage medium, and wherein at least one of the indicated segments has start and end points between the beginning and end of the media content that comprises less than all of the media content in the media file having the segment;
adding to the playback definition the plurality of segments defined through the user input and the ordering of the segments;
a media player to process the playback definition in response to initiating an operation to play the playback definition by performing for each segment and location indicated in the playback definition according to the ordering:
accessing the media content between the start and end points indicated in the segment from the location indicated in the media file locater for the segment;
rendering the accessed media content between the start and end points indicated in the segment; and
accessing a next segment from the playback definition in response to determining that there is a next segment and in response to rendering the accessed media content, wherein the operations of accessing the media content and rendering the accessed media content are performed for the accessed next segment.

12. The system of claim 11, wherein the media files are stored in at least one storage medium, and wherein the user input for each segment indicates the media file locator of the media file in which the segment is included, wherein the media player accesses, in the indicated ordering, the segments from the media files at the media file locators in the at least one storage medium to continuously render the segments.

13. The system of claim 11, wherein the media player automatically plays the segments indicated in the playback definition uninterrupted in the indicated ordering.

14. The system of claim 11, further comprising:
a library of playback definitions for different media files;
a server enabled to perform operations, the operations comprising:
receiving a customer request over a network for one of the playback definitions; and
transmitting the requested playback definition to the customer initiating the request, wherein the customer media player processes the received playback definition to play the segments of the media files accessible to the customer media player in the ordering indicated in the playback definition.

15. The system of manufacture of claim 11, further comprising a first device and a second device, wherein the playback editor is implemented in the first device, wherein the media player is implemented in the second device, and wherein the second device does not perform the playback editor functions of receiving the user input and generating the playback definitions and can only render segments in the playback definition.

16. The system of claim 11, wherein the start and end points comprise one of a user set index, a section name of the media content, and a time stamp of a frame having the media content.

17. A method, comprising:
generating a user interface to create a playback definition, wherein the user interface is manipulated by a user to perform:

receiving user input to create the playback definition;

creating the playback definition in response to the received user input;

receiving user input indicating a plurality of segments of media content from a plurality of media files and an ordering of the segments, wherein the media content comprises at least one of audio and video content, wherein the segments each indicate a start point and end point in the media content in one of the files and a media file locator indicating a location of the media in a computer readable storage medium, and wherein at least one of the indicated segments has start and end points between the beginning and end of the media content that comprises less than all of the media content in the media file having the segment;

adding to the playback definition the plurality of segments defined through the user input and the ordering of the segments;

processing the playback definition in response to initiating an operation to play the playback definition by performing for each segment and location indicated in the playback definition according to the ordering:

accessing the media content between the start and end points indicated in the segment from the location indicated in the media file locator for the segment;

rendering the accessed media content between the start and end points indicated in the segment; and accessing a next segment from the playback definition in response to determining that there is a next segment and in response to rendering the accessed media content, wherein the operations of accessing the media content and rendering the accessed media content are performed for the accessed next segment.

18. The method of claim 17, wherein the media files are stored in at least one storage medium, and wherein the user input for each segment indicates the media file locator of the media file in which the segment is included, wherein the segments are accessed, in the indicated ordering, from the media files at the media file locators in the at least one storage medium to continuously render the segments.

19. The method of claim 18, further comprising:

determining at least one storage location of the media files using the media file locators indicated in the segments, wherein the segments are accessed from the determined at least one storage location.

20. The method of claim 17, wherein the segments indicated in the playback definition are automatically rendered uninterrupted in the indicated ordering.

21. The method of claim 17, further comprising:

maintaining a library of playback definitions for different media files;

receiving a customer request over a network for one of the playback definitions; and transmitting the requested playback definition to the customer initiating the request, wherein a customer media player processes the received playback definition to play the segments of the media files accessible to the customer media player in the ordering indicated in the playback definition.

22. The method of claim 17, wherein a playback editor implemented in a first device performs the operations of generating the user interface to create the playback definition, wherein a second device performs the operations of processing the playback definition to render the media content, and wherein the second device does not perform the playback editor functions of receiving the user input and generating the playback definitions and can only render segments in the playback definition.

23. The method of claim 17, wherein the start and end points comprise one of a user set index, a section name of the media content, and a time stamp of a frame having the media content.

* * * * *